(12) United States Patent
Ivarsøy et al.

(10) Patent No.: US 7,900,137 B2
(45) Date of Patent: Mar. 1, 2011

(54) PRESENTING HTML CONTENT ON A SCREEN TERMINAL DISPLAY

(75) Inventors: Geir Ivarsøy, Oslo (NO); Karl Anders Øygard, Oslo (NO); Snorre M. Grimsby, Skjetten (NO)

(73) Assignee: Opera Software ASA, Oslo (NO)

( * ) Notice: Subject to any disclaimer, the term of this patent is extended or adjusted under 35 U.S.C. 154(b) by 0 days.

(21) Appl. No.: 10/956,019

(22) Filed: Oct. 4, 2004

(65) Prior Publication Data

US 2005/0097444 A1    May 5, 2005

Related U.S. Application Data

(60) Provisional application No. 60/512,924, filed on Oct. 22, 2003.

(30) Foreign Application Priority Data

Oct. 22, 2003    (NO) .................................. 20034724

(51) Int. Cl.
 G06F 17/25    (2006.01)
 G06F 17/27    (2006.01)
(52) U.S. Cl. ...................... 715/238; 715/243; 715/248; 715/251; 715/252
(58) Field of Classification Search .................. 715/509, 715/514, 526, 539, 744, 517, 243, 227, 209, 715/273, 234, 238, 247, 251, 252
See application file for complete search history.

(56) References Cited

U.S. PATENT DOCUMENTS

| | | | |
|---|---|---|---|
| 5,897,644 A | 4/1999 | Nielsen | |
| 6,300,947 B1 | 10/2001 | Kanevsky | |
| 6,593,944 B1 | 7/2003 | Nicolas et al. | |
| 6,675,351 B1 * | 1/2004 | Leduc | ........................ 715/503 |
| 6,973,627 B1 * | 12/2005 | Appling | ....................... 715/781 |
| 7,113,946 B2 * | 9/2006 | Cosic | ............................. 707/8 |
| 7,120,866 B2 * | 10/2006 | Kotler et al. | ................ 715/515 |

(Continued)

FOREIGN PATENT DOCUMENTS

EP    0949571    10/1999

(Continued)

OTHER PUBLICATIONS

Orkut Buyukkokten et al, "Accordion Summarization for End-Game Browsing on PDAs and Cellular Phones", Published: Apr. 4, 2001, Publisher: ACM, pp. 213-220.*

(Continued)

*Primary Examiner*—Stephen S Hong
*Assistant Examiner*—Wilson Tsui
(74) *Attorney, Agent, or Firm*—Birch, Stewart, Kolasch and Birch, LLP

(57) ABSTRACT

The object of the present invention is to render markup documents within the limits of resolutions smaller than the resolutions for which the markup documents were originally designed, in most cases without introducing horizontal scrolling, while keeping the original fonts, colors, design, and style. The object is achieved by finding and selecting elements whose content takes up too much space horizontally, determining appropriate widths for rendering such elements, and shrinking or horizontally squeezing such elements individually to fit within their respective determined widths. Further, the invention determines the widths for rendering table cells in such manner as to preserve the layout of the corresponding table.

10 Claims, 5 Drawing Sheets

U.S. PATENT DOCUMENTS

| | | | |
|---|---|---|---|
| 7,222,306 B2* | 5/2007 | Kaasila et al. | 715/801 |
| 7,362,311 B2* | 4/2008 | Filner et al. | 345/169 |
| 2002/0021308 A1 | 2/2002 | White et al. | |
| 2002/0030699 A1 | 3/2002 | Van Ee | |
| 2002/0111972 A1 | 8/2002 | Lynch et al. | |
| 2003/0115167 A1* | 6/2003 | Sharif et al. | 707/1 |
| 2003/0229845 A1* | 12/2003 | Salesin et al. | 715/500 |
| 2004/0049737 A1* | 3/2004 | Hunt et al. | 715/513 |
| 2005/0015708 A1* | 1/2005 | Tamaru | 715/500 |

FOREIGN PATENT DOCUMENTS

| | | |
|---|---|---|
| JP | 10-116065 A | 5/1998 |
| JP | 20002-63016 A | 2/2002 |
| WO | WO 01/77886 | 10/2001 |
| WO | WO 01/86462 | 11/2001 |

OTHER PUBLICATIONS

"Webstage: An active Media Enhanced World Wide Web browser", Yamaguchi, Hosomo & Miyashita, CHI 97, Mar. 22-27, 1997.

"Converting PC GUIS for nonPC Devices", Johnson, Circuit Cellular Ink vol. 91, Feb. 1998 pp. 40-42.

"Web Page Filtering and Re-authoring for Mobile Users", Bickmore et al, COmputer Journal, Oxford Univ. Press, vol. 42, No. 6 1999, pp. 534-546.

"Das Web in der Hand", Bleich, CT MAgazin Fuer Computer Technik, Verlag Heise GmbH, Jan. 27, 2003 pp. 144-149.

* cited by examiner

PRESENTING HTML CONTENT ON A SCREEN TERMINAL DISPLAY

This application claims the benefit of U.S. Provisional Patent Application 60/512,924, filed 22 Oct. 2003.

BACKGROUND OF THE INVENTION

1. Field of the Invention

The present invention relates in general to the technical field of data processing for displaying information on electronic communication terminals. More specifically, the invention relates to a rendering technique for Web browsers (X)HTML or CSS user agents (UAs) that is required to render readable Web pages, with limited or no horizontal scrolling, on devices with limited resolution.

2. Prior Art

Most Web pages are designed with personal computers (PCs) in mind. Typically, the screen width on a PC is assumed to be at least 800 pixels. Smaller devices with smaller resolutions (screen sizes) therefore cannot render most such Web pages as designed without introducing horizontal scrolling.

There exist several different technologies for presenting Web documents (e.g (X)HTML) on smaller displays than those that the documents were originally written for.

For smart phones (devices able to read Web pages), Opera Software has introduced Small-Screen Rendering (SSR), ref. patent application PCT/NO03/00300. SSR reformats Web pages so they fit on small screens with much lower screen resolution than a Web page is designed for. Opera's small-screen technology adapts a Web document to a small screen by sometimes drastically changing the document's design as intended by its author. Colors, fonts, design, and style are changed; document content is moved, scaled down, or sometimes removed. SSR assumes a small screen and leaves large areas of a medium-sized screen unused.

SSR therefore works well on very small screens, for example mobile phones, but for medium-sized screens, for example PDAs, SSR is not a good solution.

Another technology for presenting Web documents on smaller displays is TV centric layout. This solution attempts to display a Web page on a television display without using horizontal scroll bars, while preserving the look and feel of the Web page as originally contemplated by the designer. A method is used where a first layout is received, with statistics for resolution, total width, and cell widths, and a second layout is then generated for display at a second resolution by comparing statistics from layout one with selected thresholds for layout two. The method then invokes horizontal shrinking (or growing) of cells in response to the comparison. If the second layout is not within the specified threshold, the process of cell reduction is repeated.

The present invention Medium-Screen Rendering (MSR) differs substantially from this approach in many ways. Most importantly, MSR is not an iterative process. MSR does not need to compare layouts before reduction, nor calculate the width of for example the largest element or embeds within a non-breaking line or cell.

Modern Web browsers must implement functions such as dynamic layout and the Document Object Model (DOM) to function properly on the Internet. An iterative approach to resizing elements (e.g. table cells) and producing page layouts may result in unacceptable performance, especially on devices with limited computing power.

Another solution is "Just Fit". This method cannot properly handle box elements, positioned outside of the available horizontal space (viewing area). Nor has it solved the problem with a non-breaking line of elements that extends outside the viewing area; in such a case, "Just Fit" will introduce line breaks between non-breaking elements, which alters the intended layout. This may also disrupt for example the functionality of menus.

To zoom out the whole Web page is another method to avoid horizontal scrolling, with the risk of making some of or the entire page unreadable.

Zooming an entire Web page out, but increasing the relative font size as the page is zoomed out, ensures that fonts are readable as the actual minimum font does not go below a set value even though other content is zoomed out. The drawback with this method is that the page quickly loses its original look and feel because the relation between text and other content will be distorted.

U.S. Pat. No. 6,593,944 with the title "Displaying a web page on an electronic display device having a limited display area" is an example of yet another approach aiming to solve the problems involved with the other zoom solutions. In this approach the entire page is zoomed out to fit the screen and presented to a user that selects the part of the page to be zoomed in for reading. The drawback of this method is that a user must move a pointing device (e.g. a mouse) around to read different parts of the page.

The aforementioned methods are all performed on the client-side (e.g. by a Web browser).

There also exist proxy or local software content transformations. A proxy solution is a server-side solution that alters Web content before it is served to the user agent electronic device. Drawbacks with this method are that it slows down surfing and users must in some way subscribe to the service. Further, the service provider must purchase a software solution, and the quality of the solution is not necessarily better than client-side solutions.

Local software content transformations is a client-side solution that resembles a server-side solution in that a transformation is performed before content is served to the UA, but it is done on the client. This requires installing additional software on the device. It will also require more system resources (e.g. memory and CPU), which may slow down surfing.

The present invention uses a new approach for presenting Web pages (e.g. HTML or XHTML) on medium-sized screens. The main object is to present a scaled down version of the original Web page on a medium-sized display, while maintaining the look and feel of the original Web page. The solution developed is called Medium-Screen Rendering (MSR).

MSR can be used on devices of all kinds that share among these aspects:

- Device renders markup language (e.g. HTML, XHTML, XML, WML, cHTML, HTMLP etc.);
- Markup can be styled, for example using Cascading Style Sheets (CSS);
- Media output (e.g. viewing area) ranges between approximately 300 and 800 pixels in width, or is smaller than the media output for which the markup was initially designed.
- Horizontal scrolling is impossible or not desired.

In the present invention, the necessary changes to Web pages are done by a Web browser embodied on a client and not by a proxy server or client-side content-transformation software before serving the Web page to the client.

The invention can typically be used on, but is not limited to, TVs, PDAs, PCs or smart phones with medium-sized screens, or even printers.

OBJECTS AND SUMMARY OF THE INVENTION

The object of the present invention is to render markup documents within the limits of resolutions smaller than the resolutions for which documents were originally designed, in most cases without introducing horizontal scrolling.

The object is achieved by redefining elements in the document while keeping the original fonts, colors, design, and style. The invention finds content that takes up too much horizontal space and squeezes horizontally or shrinks these page elements (boxes) individually. Original fonts and colors are kept, and the design and style is left virtually untouched. In this process, very little of the design and style (e.g. CSS rules) is changed. The method may, if necessary, attempt to move document content (boxes) to avoid unused (empty) screen space.

The end result is a presentation of the markup document that is very close to the original design, but that fits on a medium-sized resolution (e.g. a screen).

The above objects are achieved by means of a method, a client terminal, and a computer program as set forth in the appended set of claims.

DETAILED DESCRIPTION OF THE INVENTION

BRIEF LIST OF DRAWINGS

The invention will be described in further detail by reference to the figures, wherein:

FIG. 3 is an example of typical Web pages designed for viewing on a PC screen.

FIG. 4 is an example of how the Web page in FIG. 3 will be presented on according to the invention.

DETAILED DESCRIPTION OF A PREFERRED EMBODIMENT

Figure 1:
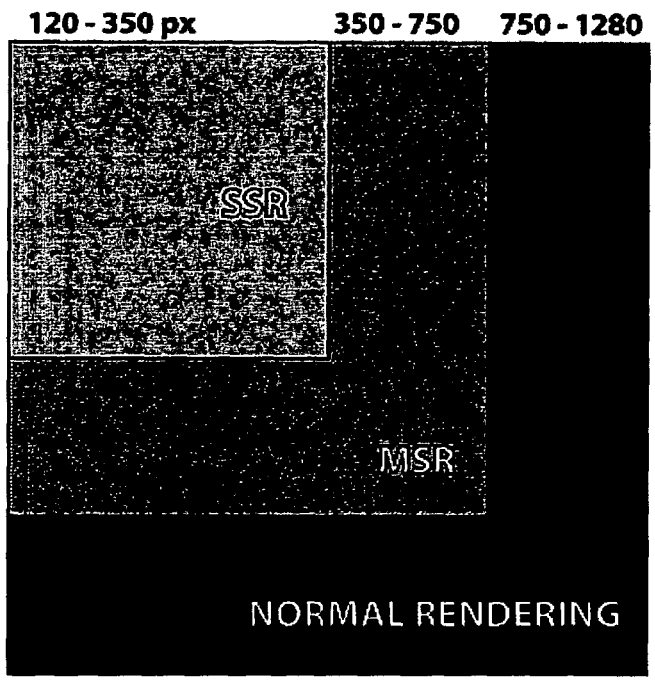
FIG. 1 is a diagram that shows screen sizes in pixels and a typical rendering method.

FIG. 1 is a diagram showing screen sizes in pixels and a typical rendering method.

Small-Screen Rendering (SSR) is typically used on electronic devices with a screen resolution between 120 to 350 pixels, for example smart phones.

Medium-Screen Rendering (MSR), which is the method according to the present invention, is intended for use on devices with a screen resolution between 350 and 750 pixels, e.g. PDAs.

Normal rendering is used on devices with a screen resolution of more than 750 pixels, for example PCs.

Figure 2:
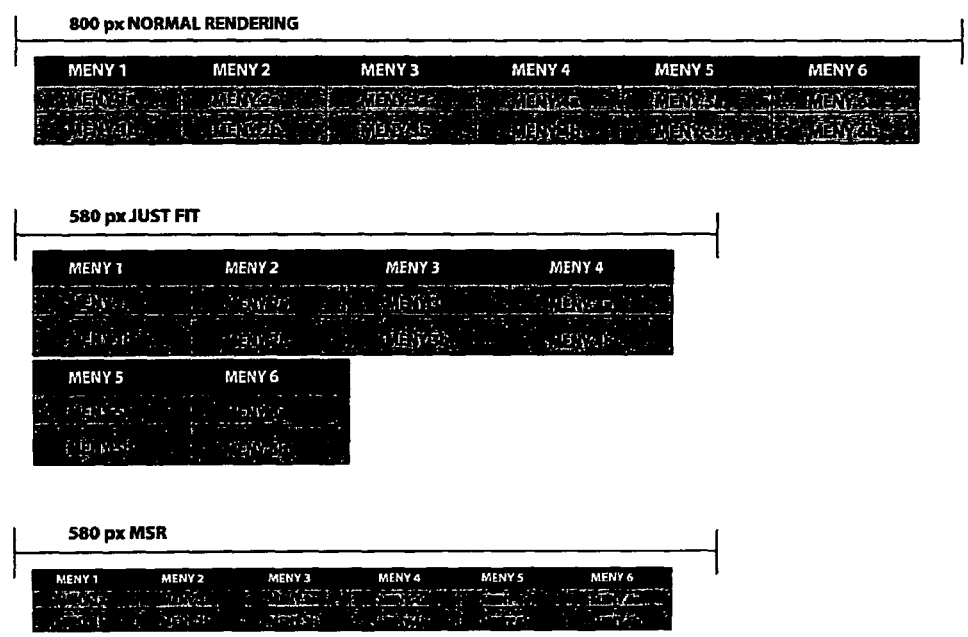
FIG. 2 shows three different rendering methods and the resulting presentation.

FIG. 2 shows three different examples of rendering methods and the resulting presentation. The first example shows how a typical menu, if it consists of a line of non-breaking images contained in a single table cell, is presented as intended on a display with 800 pixels.

The next example shows how the same menu will look when using the "Just Fit" method to render the Web page on a display only 580 pixels wide. This method will introduce line breaks between non-breaking elements.

The third example shows how the same menu will look when viewed on a display with 580 pixels using a browser that has implemented the method according to the present invention. The menu will look like the menu in the first example. MSR will identify the entire line of non-breaking images, and shrink the images without breaking the line.

Figure 3:
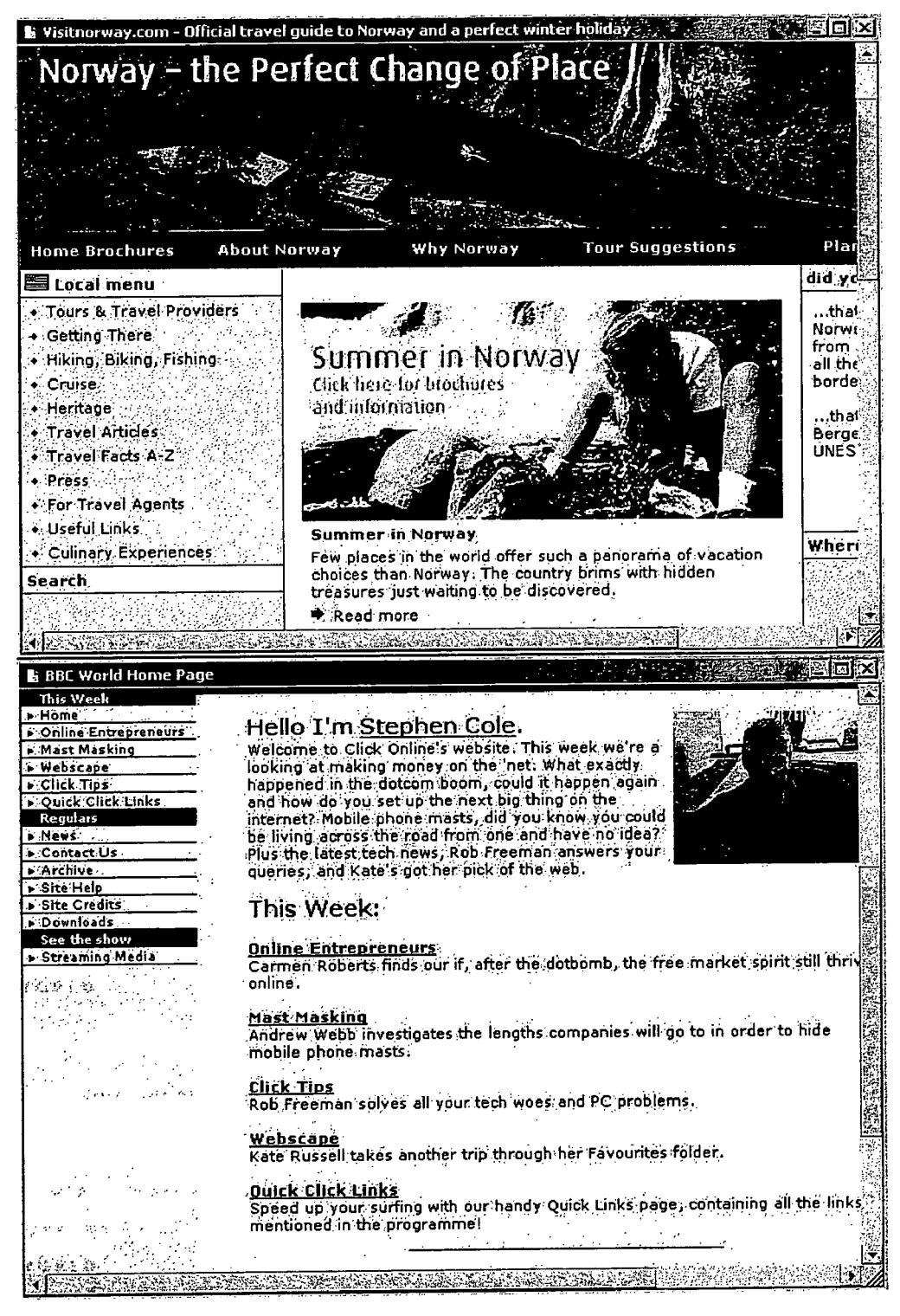

FIG. 3 shows an example of two typical Web pages designed for viewing on a PC screen. Horizontal scrolling is introduced because the documents cannot fit within the available space (approximately 640 pixels). A typical Web page will have a specific layout and contain for example text, images, and form controls. Pages can be designed using for instance tables, special HTML elements, element attributes, CSS, or by combining these methods.

Figure 4:
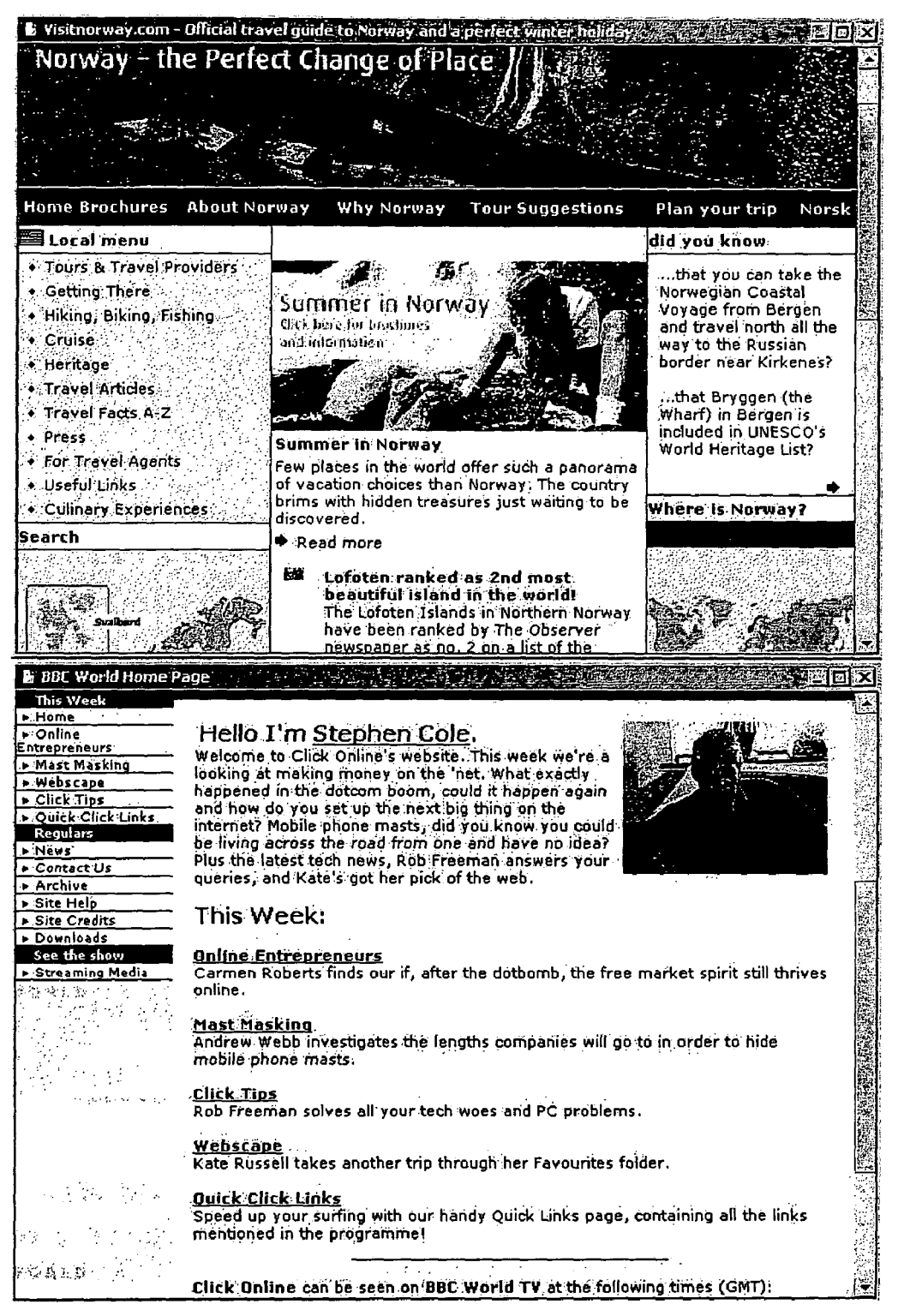

FIG. 4 shows the same Web pages as shown in FIG. 3, except that they are rendered using the MSR technology. No horizontal scrolling is necessary even though the documents are rendered on a display with a smaller resolution (fewer horizontal pixels) than the Web pages were originally designed for. The look and feel of the original Web pages is retained.

Figure 5:
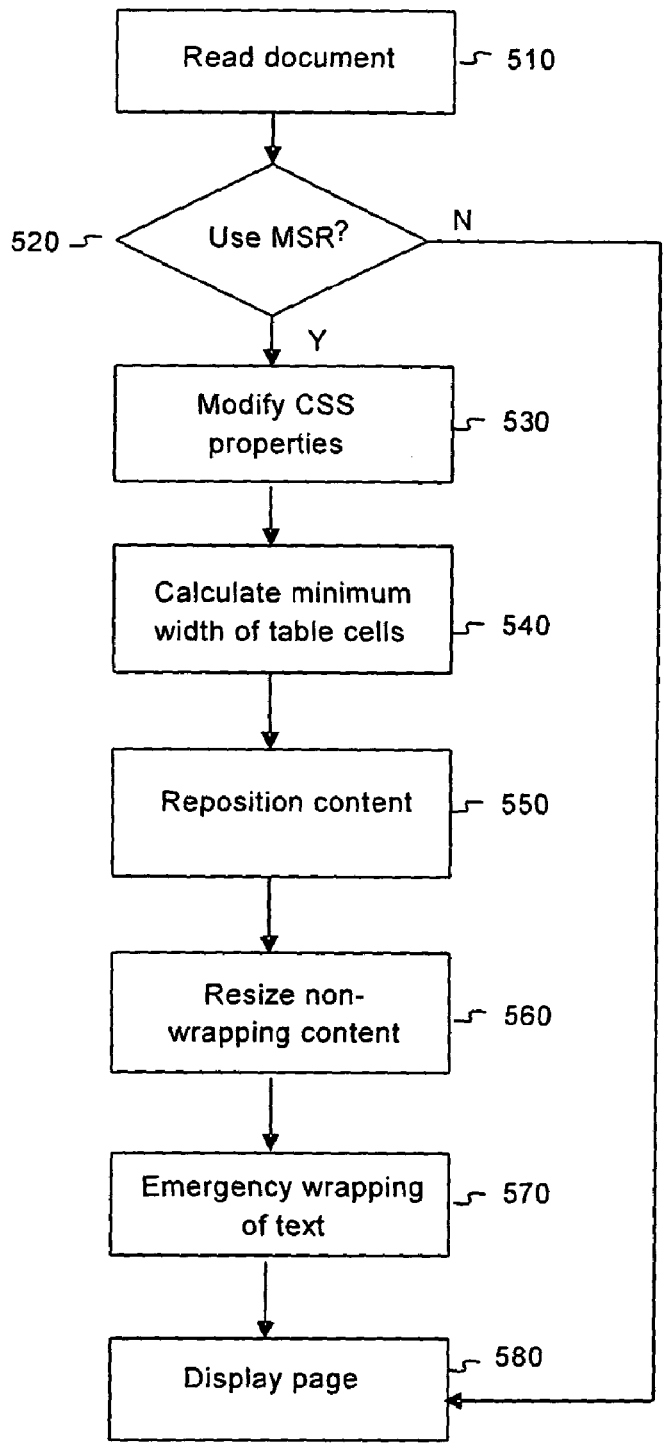
FIG. 5 is a flow chart of an embodiment of the invention.

FIG. 5 is a flow chart of one embodiment of the present invention. The flowchart shows the different steps that are included in the inventive method. Even though these steps are listed in a sequence, the order may be different and some or all of the steps can be performed at the same time. The figure thus represents an example.

The first step is to read a document (e.g. (X)HTML) in step 510, and in step 520 decide whether it is necessary to perform a Medium-Screen Rendering (MSR) of the document, or parts of the document, according to the inventive method.

MSR may be necessary if the document is to be read on a display with a resolution lower than the document is designed for. MSR can be triggered automatically (to avoid horizontal scrolling), or toggled from a user interface. If it is not necessary to use MSR, the Web page will be rendered normally.

If it is necessary to use the MSR method on the document, or parts of the document, steps 530 to 570 will be implemented.

One step 530 is to modify the CSS properties by ignoring certain elements when sizing table cells.

In traditional (X)HTML and CSS table formatting, cells may be sized using the following equation:

$$W_{pref} = \max(\min(W_A, W_{max\,I}), W_{min\,I})$$

where:

$W_{pref}$ is the preferred cell width—the width of the cell prior to taking other cells into account. $W_{pref}$ of each cell in the table is used when calculating the final width of each column. (Exactly how this is performed is outside the scope of this discussion.)

$W_A$ is the available width—typically the widths of the containing block (a CSS term); this is the amount of room into which the cell can expand.

$W_{max\,I}$ is the maximum intrinsic width—the width found by conceptually following the following steps:
Set the width to infinity,
Lay the cell contents out. This should result in the fewest number of line breaks possible,
Shrink the width until either the number of line breaks increases, or the amount of overflow increases.

$W_{min\,I}$ is the minimum intrinsic width; the width found by conceptually following the following steps:
Set the width to the maximum intrinsic width,
Lay the cell contents out. This should result in the fewest number of line breaks possible,
Shrink the width until the amount of overflow increases, allowing lines to break as required.

For more information, please see the W3C Working Draft (Tables chapter) of the CSS 2.1 Specification: URI: http://www.w3.org/TR/CSS21/tables.html#auto-table-layout.

In step 540 a calculation of minimum width of table cells is performed. Opera's Medium-Screen Rendering technology changes the algorithm described above by always assuming that replaced content, for example iframes, images, plug-ins, applets, and form elements, should have no influence on the calculation of $W_{min\,T}$.

As a result, the Web browser with MSR technology will allow a table cell to shrink, if necessary to avoid horizontal scrolling, even if the width of the replaced content then exceeds (overflows) the width of the containing table cell.

Width of table cells is also set to auto; an author's request for a (minimum) table-cell width is therefore not considered when calculating a minimum width. However, that width is still used when available space is distributed between cells (or columns), and when maximum width is calculated. By setting the width to auto, the width of the screen on the device with a limited display will define the new width of the table cells in the horizontal direction.

As described above, content can force for example table cells to increase in size. By setting the maximum width of child elements to equal the width of their containing element (i.e. a maximum width of 100%), it is ensured that elements do not overflow their containing block.

Thus, when MSR reduces for example a table cell's width to a value that is smaller than the original width, and the content of that cell exceeds the cell's new boundaries, the MSR browser functionality will shrink the content of that cell until it fits without overflowing.

Content that is not placed inside tables is also shrunk or squeezed (i.e. squeezed without maintaining aspect ratio) to avoid overflow. Therefore, if, for example, a document window, even when maximized to use all available screen space, contains a document that was designed for a resolution higher than the available resolution, Opera's MSR functionality will squeeze the entire document and individually shrink, squeeze, or move its content as deemed necessary to force-fit the document within the available space.

If an element already has a maximum width of less than 100% of its containing element, or a width that is set to auto, the browser with MSR implemented will not change it unless further size reduction is necessary.

If images are scaled down to fit within their containing block, they are scaled both horizontally and vertically to preserve the aspect ratio.

In step 550, a repositioning of page elements positioned outside the width of the screen is performed to avoid horizontal scrolling. This is done by:
  Identifying the page element,
  Analyzing the element with regard to size and functionality,
  Approving or disapproving the element for repositioning,
  Repositioning the element (if approved) either based on where it occurs in the markup (document source), or at the top or bottom of the Web page.

In step 560 a resizing of non-wrapping content is performed. Where more than one element is inside the same parent element (e.g. a table cell), and they do not wrap, setting a maximum width of 100% on each element may result in overflow of the containing box. In such cases, MSR shrinks the entire non-breaking line of elements (typically several images in a menu inside the same table cell) to fit inside the containing box. When non-wrapping content occurs outside tables, MSR may introduce an extra (invisible) element that is used to calculate the new size of the non-wrapping content.

In step 570 an emergency wrapping of text is performed. As part of the Medium-Screen Rendering technology, the values of the CSS "white-space" property are mapped as follows:

| Specified Property | MSR Treatment |
|---|---|
| Normal | Normal |
| Pre | pre-wrap |
| Nowrap | Normal |
| Pre-wrap | pre-wrap |
| Pre-line | pre-line |

Inside table cells, the Opera browser will override authors and turn the "nowrap" property off.

On elements where the "white-space" property is mapped to "pre-wrap", letter spacing is decreased by one pixel if the initial value is greater than −1.

In addition, the wrapping behavior is modified to allow emergency wrapping in the middle of words (i.e. splitting up words where one normally would not), when normal wrapping would fail to avoid overflow or horizontal scrolling.

This modified text wrapping is necessary in MSR to avoid overflow and horizontal scrolling, and allows for smaller minimum widths in for example table cells and columns.

In step 580 the resulting page is displayed on an electronic device.

When Opera combines the MSR way of calculating minimum widths with other MSR functions (as described above), Opera can, in most cases, render a document (Web page) very closely to the original in style and layout, on a medium-sized screen, without introducing horizontal scrolling.

The MSR functionality can be turned on and off from the user interface, or set to auto. If MSR is set to auto, the Opera browser will turn MSR on to avoid horizontal scrolling.

MSR can be disabled for documents that have been coded for handheld devices or TVs:
  Special markup languages such as WML, XHTML MP, and cHTML
  Styling for handheld or tv media (@media handheld or @media tv)

Figure 6:
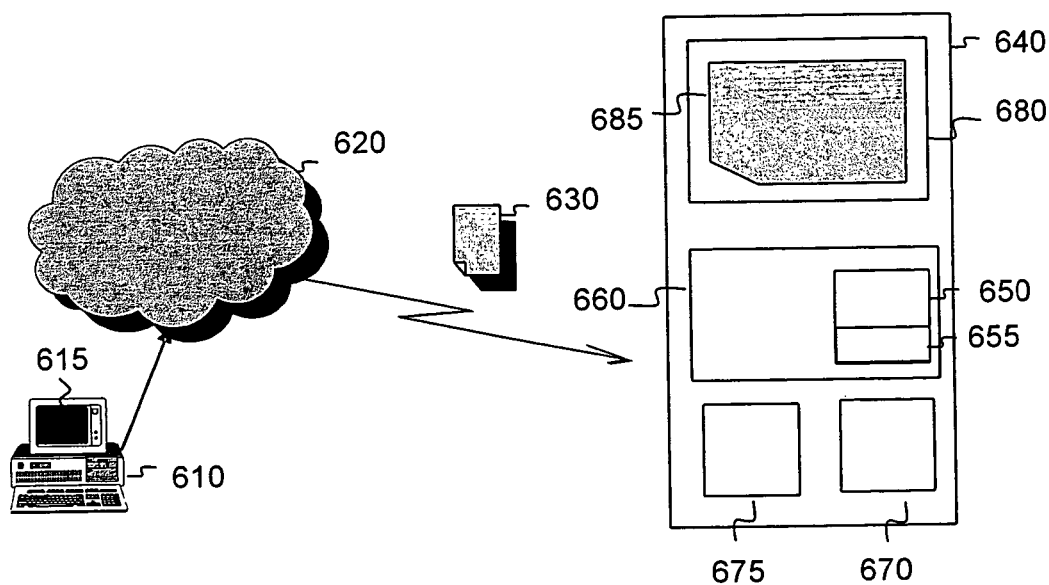
FIG. 6 is a diagram that illustrates a system using the inventive method.

FIG. 6 is an overview of a system and electronic device 640 implementing the inventive method. A Web document 630 written for viewing on a first screen 615 on a for instance a PC 610 is received through the Internet 620 on an electronic device 640 with a smaller display 680 than the Web document 630 is designed for. The Web document is received by receiving means 675 in the electronic device 640, and read by a Web browser 650 loaded into a memory 660. The Web browser is provided with a module with separate functions 655 for redefining elements in a Web document 630 so it will fit on a smaller display 680 while reducing horizontal scrolling to a minimum.

The electronic device 640 comprises a processing unit 670 that is arranged to perform the functions according to the inventive method.

The inventive method is implemented in a web browser capable of modifying and presenting content in a web document adapted to the physical characteristics of the display of the electronic device 640.

As said, the different functions that are implemented in each step described above are not necessarily performed in a sequence. The functions are working together, and some or all of them may be performed at the same time.

The invention claimed is:

1. Method for modifying and presenting content in a document written in a markup language for presentation as a page on a display screen of a device with smaller resolution than the document originally is designed for, by means of a browser installed on the device, the markup language document comprising a plurality of containing elements which contain content, the document having at least one multi-column table, the method comprising the steps of:

determining a final width for at least some of the containing elements for rendering on the display screen, wherein:

for each of the at least some of the containing elements which is a table cell, calculating a minimum width and applying the calculated minimum width as a lower limit for the final width of the cell, the minimum width of the cell being calculated by:

overriding any author defined width by setting the width of the cell to auto, and in the event the cell comprises replaced content external to the document, ignoring the width of the replaced content of the cell;

for each of the at least some of the containing elements which contains non-wrapping content, resizing the non-wrapping content by shrinking or squeezing such content to fit inside the determined final width of the containing element;

repositioning any page element in the document determined to be positioned outside the width of the display screen based on size and functionality of the page element;

for each of the at least some of the containing elements which contains text subject to a wrapping property explicitly defined by an author to restrict wrapping of the text, wrapping the text by overriding the wrapping property when necessary to prevent the text from extending beyond the determined final width of the containing element; and displaying the document on the display screen according to the determined final widths of the at least some of the containing elements and the repositioning, wherein in the event the document includes a multi-column table, the document is displayed in accordance with the determined final widths in such manner as to preserve the multi-column layout of the table cells in the table.

2. Method according to claim 1, wherein the at least some of the containing elements includes a containing element, which contains non-wrapping content or text, whose determined final width represents the width of the, screen.

3. Method according to claim 1, wherein the at least some of the containing elements includes a block element which contains non-wrapping content or text.

4. Method according to claim 1, wherein the at least some of the containing elements includes a table cell containing non-wrapping content or text.

5. Method according to claim 1, wherein the page element is repositioned by moving it to the top of the page, to the bottom of the page, or by placing it in a position in the page representative of where the page element is represented in the markup language of the document.

6. Method according to claim 1, wherein the wrapping property is overridden by replacing a CSS white-space "Pre" property with a CSS white-space "Pre-wrap" property and by replacing any CSS white-space "Nowrap" property with a CSS white-space "Normal" property.

7. Method according to claim 1, wherein the wrapping of text by overriding the wrapping, property is done in the middle of a word.

8. Method according to claim 1, wherein the page element is among all types of elements that can be included in the markup language.

9. Electronic device comprising a processing unit, a memory and a display screen for presentation of content in a document written in a markup language as a page on said display screen, and configured to modify and present the document when said display has a smaller resolution than the document originally is designed for, the document comprising a plurality of containing elements which contain content, the document having at least one multi-column table, the electronic device being configured to execute a browser to perform the steps of:

determining a final width for at least some of the containing elements for rendering on the display screen, wherein:

in the event where the document contains table cells, calculating a minimum width as a lower limit for the final width of each of the table cells, the minimum width of each of the table cells being calculated by:

overriding any author defined width by setting the width of the cell to auto, and in the event the table cell contains replaced content external to the document, ignoring the width of the replaced content of the cell;

for each of the at least some of the containing elements which contains non-wrapping content, resizing the non-wrapping content by shrinking or squeezing such content to fit inside the determined final width of the containing element;

repositioning any page element in the document determined to be positioned outside the width of the display screen based on size and functionality of the page element;

for each of the at least some of the containing elements which contains text subject to a wrapping property explicitly defined by an author to restrict wrapping of the text, wrapping the text by overriding the wrapping property when necessary to prevent the text from extending beyond the determined final width of the containing element; and displaying the document on the display according to the determined final widths of the at least some of the containing elements and the repositioning, wherein in the event the document includes a multi-column table, the document is displayed in accordance with the determined final widths in such manner as to preserve the multi-column layout of the table cells in the table.

10. A computer-readable media encoded with a data structure in the form of a web browser program comprising instructions for, when installed and run on an electronic device, modifying and presenting content in a document written in a markup language for presentation on a display screen of the device with smaller resolution than the document originally is designed for, the markup language document comprising a plurality of containing elements which contain content, the document having at least one multi-column table, the web browser program comprising instructions for:

determining a final width for at least some of the containing elements for rendering on the display screen, wherein:

for each of the at least some of the containing elements which is a table cell, calculating a minimum width and applying the calculated minimum width as a lower limit for the final width of the table cell, the minimum width of the table cell being calculated by:

overriding any author defined width by setting the width of the table cell to auto, and in the event the table cell contains replaced content external to the document, ignoring the width of the replaced content of the cell;

for each of the at least some of the containing elements which contains non-wrapping content, resizing the non-wrapping content by shrinking or squeezing such content to fit inside the determined final width of the containing element;

repositioning any element in the document determined to be positioned outside the width of the display screen based on size and functionality of the page element;

for each of the at least some of the containing elements which contains text subject to a wrapping property explicitly defined by an author to restrict wrapping of the text, wrapping the text by overriding the wrapping property when necessary to prevent the text from extending beyond the determined final width of the containing element; and displaying the document on the display screen in accordance with the determined final widths of the at least some of the containing elements and the repositioning, wherein in the event the document includes a multi-column table, the document is displayed in accordance with the determined final widths in such manner as to preserve the multi-column layout of the table cells in the table.

\* \* \* \* \*